March 11, 1941.　　　　　E. A. TUBBS　　　　　2,234,461
METHOD AND APPARATUS FOR CONTROLLING THE FREQUENCY
BAND WIDTH OF COUPLED CIRCUITS
Filed July 3, 1937　　　　7 Sheets-Sheet 1

INVENTOR
ERNEST A. TUBBS
BY
Braxelton Whiteouf + Davis
ATTORNEYS

March 11, 1941.                    E. A. TUBBS                    2,234,461
          METHOD AND APPARATUS FOR CONTROLLING THE FREQUENCY
                    BAND WIDTH OF COUPLED CIRCUITS
                       Filed July 3, 1937           7 Sheets-Sheet 2

INVENTOR
ERNEST A. TUBBS
BY
Braselton, Whitcomb & Davies
ATTORNEYS

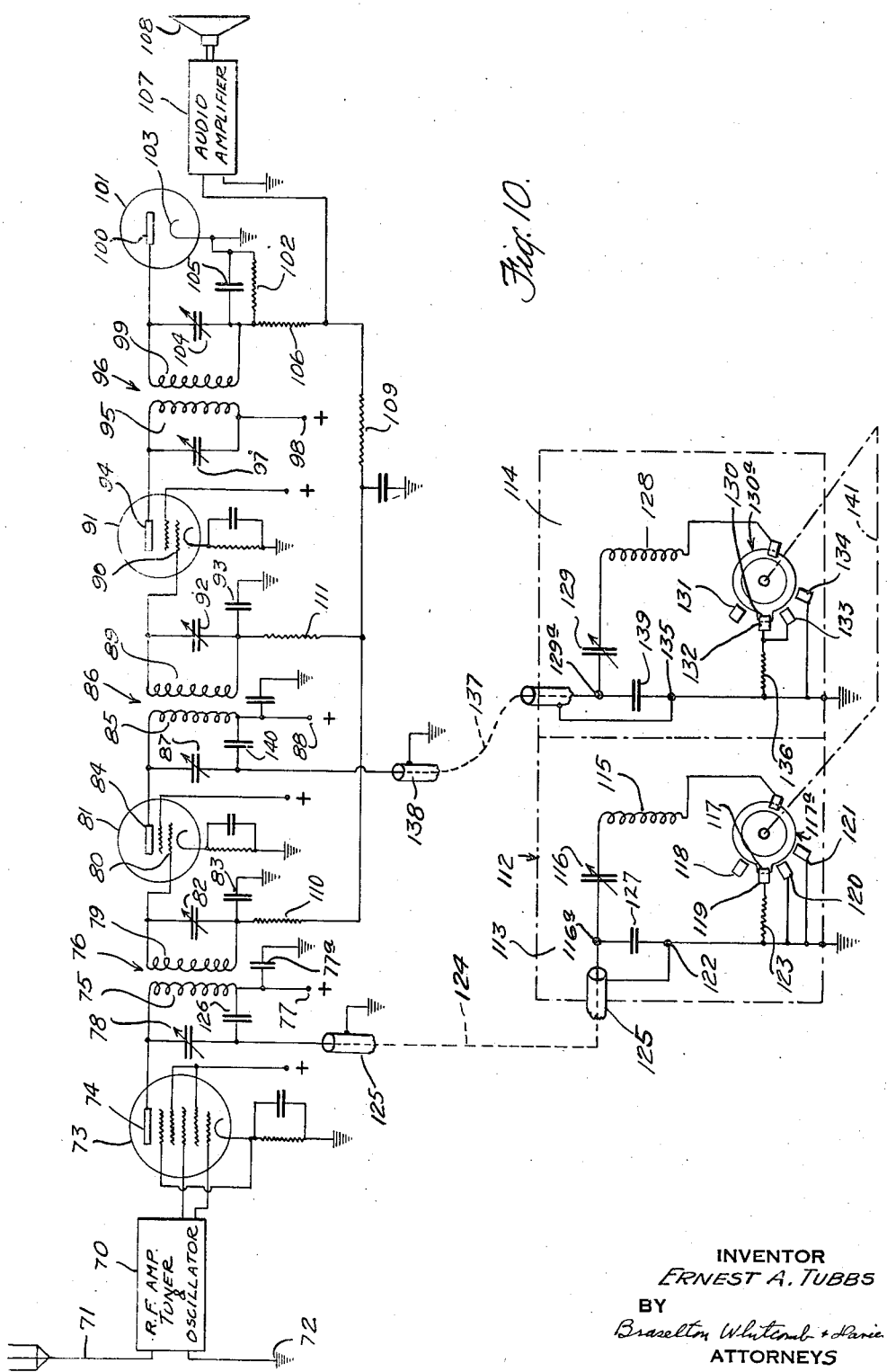

March 11, 1941.  E. A. TUBBS  2,234,461
METHOD AND APPARATUS FOR CONTROLLING THE FREQUENCY
BAND WIDTH OF COUPLED CIRCUITS
Filed July 3, 1937  7 Sheets-Sheet 5
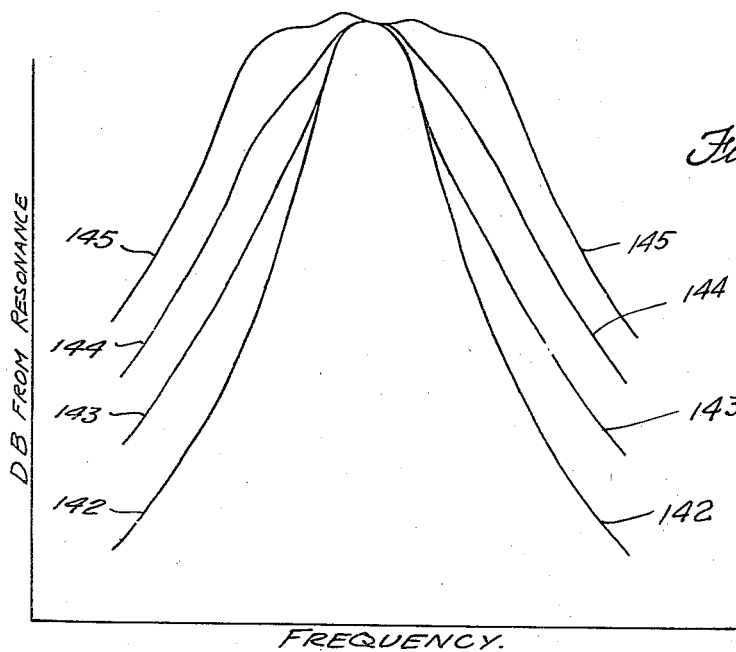
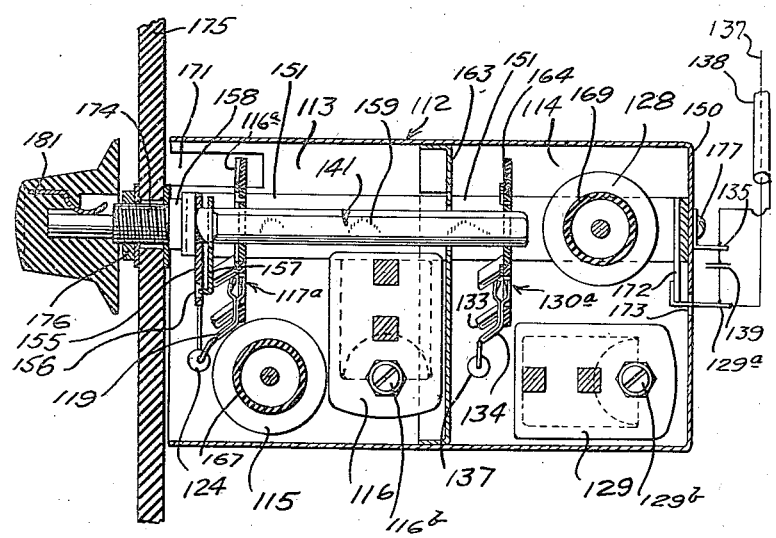
INVENTOR
ERNEST A. TUBBS
BY
ATTORNEYS

INVENTOR
ERNEST A. TUBBS
BY
ATTORNEYS

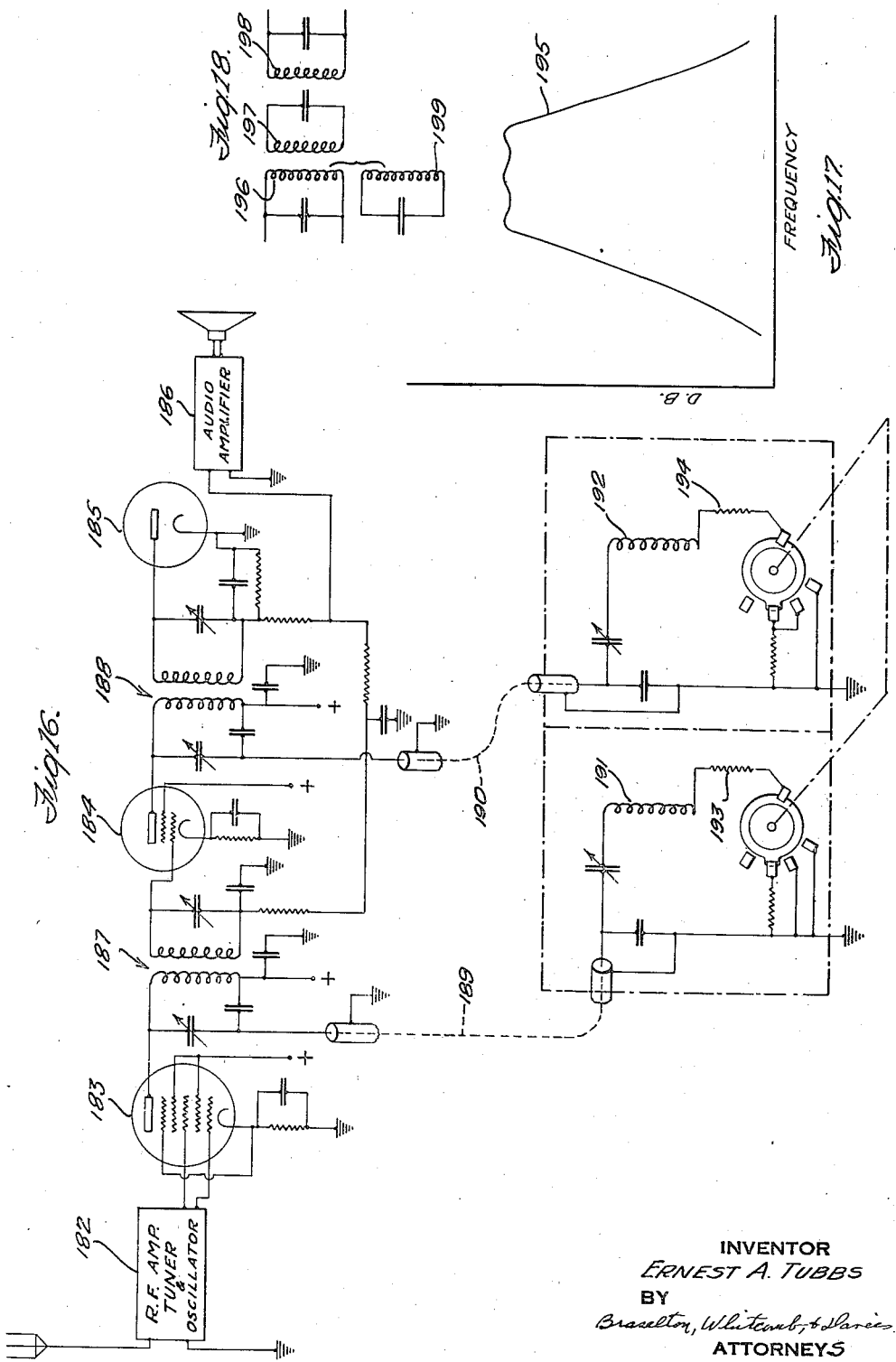

Patented Mar. 11, 1941

2,234,461

UNITED STATES PATENT OFFICE 2,234,461

METHOD AND APPARATUS FOR CONTROLLING THE FREQUENCY BAND WIDTH OF COUPLED CIRCUITS

Ernest A. Tubbs, Long Island City, N. Y., assignor to National Television Corporation, Wilmington, Del., a corporation of Delaware Application July 3, 1937, Serial No. 151,805

18 Claims. (Cl. 179—171)

This invention relates to coupled electrical circuits and has for its principal object to provide a means and a method for controlling the frequency band width of such coupled circuits.

Another object of the invention is to provide a means and a method for adjusting the frequency band width of a coupled circuit from a remote point, the said means being free of any mechanical connection with said coupled circuit.

Still another object of the invention is to provide a device which may be electrically connected to a coupled circuit and by means of which the band width of said circuit may be adjusted within certain predetermined limits.

Still another object of the invention is to provide a band width adjusting device for coupled circuits of a radio receiving set by means of which attenuation of the signal passing through said circuits is increased as the band width is broadened.

Still another object of the invention is the provision of a band width adjusting device which may be attached to any existing superheterodyne radio receiver and by means of which the quality of reception may be controlled and improved.

Another object of the invention is to provide a band width adjusting unit which may be electrically connected to two or more coupled circuits of a constant frequency amplifier and by means of which the band width of such circuits may be simultaneously adjusted.

Other objects of the invention and objects relating to the particular arrangement of the circuits involved and the construction and operation of the apparatus for effecting the adjustment will be apparent as the description of the invention proceeds.

The invention has been illustrated and described in connection with the drawings in which:

Fig. 10 is a circuit diagram of a complete superheterodyne receiver with the band width controlling device incorporated;

Fig. 11 shows four resonance curves of the radio set of Fig. 10 illustrating four different adjustments of the tertiary circuit.

Fig. 12 is a sectional side elevational view of a band width control unit which may be applied to a radio receiver;

Fig. 16 is a circuit diagram of a modified form of the radio receiver shown in Fig. 10;

Fig. 17 shows the curve produced by the circuit of Fig. 16 with the full effect of the tertiary winding; and Fig. 18 is a circuit diagram showing the invention applied to three tuned circuits coupled in cascade.

Figure 1:
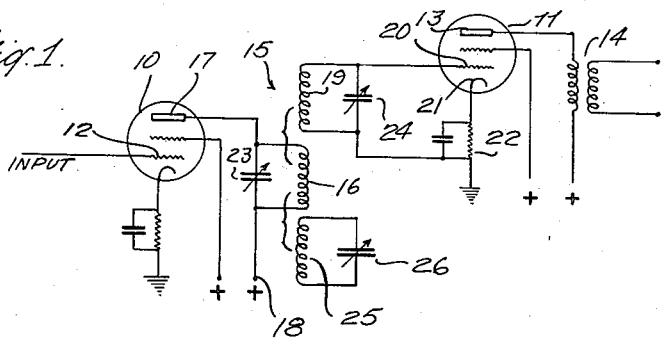
Fig. 1 is a circuit diagram of a coupled circuit with the invention incorporated.

The invention is particularly desirable and useful with radio receiving sets of the superheterodyne type. In the broadcasting of radio programs it has been the practice to allot each broadcasting station a band width of ten kilocycles, and the the stations are then spaced in the ether spectrum so that no two stations come closer together than ten kilocycles. Inasmuch as the stations are scattered all over the country and only stations separated geographically by great distances are given wave lengths separated by ten kilocycles, any given radio receiver has a few local stations in its vicinity separated by considerably more than ten kilocycles while more distant stations are closer positioned in the ether spectrum to the local stations. It is well known that the audio signal of a broadcasting station is limited by the width of the channel, this band being defined on the one side by the carrier frequency plus the highest audio frequency and on the other by the carrier frequency minus the highest audio frequency.

If a radio receiver is designed with a broad enough resonance curve so that it will pass a sufficient band of frequencies, including the carrier frequency, to receive the complete audio signal from a given broadcasting station, it often happens that if an adjacent station in the ether spectrum is strong enough some of the side bands from the adjacent station will be received by the receiver with resulting chatter or other undesirable noises, or the receiver resonance curve may even be broad enough to receive the carrier of the adjacent station with the result that the unwanted signal will be heard in the receiver.

If the resonance curve of the receiver is made sharp enough so that there will be no danger of interference from another station, then the receiver is apt to cut off some of the side bands of a wanted station, or, at least, attenuate the outermost side bands so as to produce a marked deficiency of the high notes in the received program. It is therefore highly desirable to have a band width control on a receiver so that the band of frequencies including the wanted carrier may be maintained as broad as possible without objectionable interference from adjacent stations and narrowed to eliminate interference if it becomes objectionable.

By means of the invention a radio set may be designed so that it has a broad resonance curve and is capable of receiving all of the audio signal transmitted from a given broadcasting station. Then if in listening to a given station some of the signal from an adjacent station comes through enough to be undesirable, the listener has only to make a slight adjustment, as, for instance, by the turning of a knob, to sharpen the curve of the receiver until the interfering signal is completely eliminated, or until it is eliminated to an extent which will make it unobjectionable. The invention therefore gives the listener the opportunity of receiving from any given station as complete a signal as it is possible to receive without interference from an adjacent station.

The invention provides for an extremely flexible adjustment, and one which is easy to apply and inexpensive to manufacture. It may be attached to the radio receiver at any desirable point without actual mechanical connection to the electrical parts of the set, although of course it is electrically connected to the circuit, and it eliminates moving parts in mechanical association with the amplifying circuits. The arrangement is such that the adjusting device may be separately manufactured and adapted for attachment to a standard superheterodyne receiver so that the set may be improved in operation by the addition of the band width control unit.

In order to better understand the operation of the band width controlling device of the invention and the manner in which it may be applied to coupled circuits, a brief consideration of some of the phenomena of coupled circuits may be desirable. In determining the band width of a cirsuit I make use of the well known resonance curve of the circuit which is produced by plotting the ratio of the output to input voltage against the input frequency. And I measure the band width at any desired level by the horizontal distance between the two sides of the curve which is measured in kilocycles per second. I am not so much interested, however, in the actual width of the band as I am in the shape of the curve. A substantially flat top curve with very steep sides is ideal for a radio set as the flat top insures equal reproduction of all the audio frequencies and the steep sides provide a sharp cut-off for unwanted frequencies.

In Fig. 1 is shown a circuit which may represent two stages of an amplifier including the two thermionic tubes 10 and 11, the former feeding into the latter. These tubes may be of the conventional type, and the control grid 12 of the tube 10 may be connected to the source of signal energy. The plate 13 of the tube 11 may be connected through a suitable output transformer 14 to the load circuit. The two tubes may be inductively coupled together by means of the transformer 15 which may be provided with a tuned primary 16, having one end connected to the plate 17 and the other connected to a source of positive potential indicated at 18. The secondary 19 of the transformer may have one end connected to the control grid 20 of the tube 11, while the other end is connected to ground and to the cathode 21 of the tube 11 through a suitable biasing resistance 22. Both the primary 16 and the secondary 19 may be tuned by means of condensers 23 and 24 respectively, which may be connected across the coils. This is the usual method of inductively coupling stages in an amplifier. With the present invention, however, I make use of a third or tertiary tuned coil 25 which may be tuned by means of the condenser 26 and which in this figure I have shown inductively coupled to the primary circuit.

Figure 2:
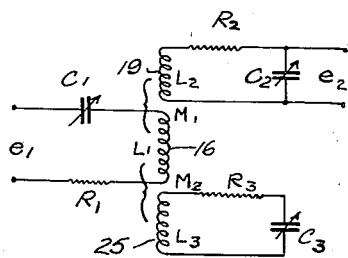
Fig. 2 is a simplified circuit diagram of the elements shown in the circuit of Fig. 1.

The values of the various parts of the circuit of Fig. 1 may be represented in a simplified form by the circuit of Fig. 2. Here the coils 16, 19 and 25 are shown with the values of the circuits represented by letters, the subscripts identifying the circuit in which the particular value belongs. Thus the circuit containing the primary coil 16 has an inductance $L_1$, a capacity $C_1$, including that of the condenser 23, and a resistance $R_1$, while a voltage $e_1$ is impressed across the circuit. The secondary circuit including the coil 19 has an inductance $L_2$, a capacitance $C_2$, and a resistance $R_2$, and a voltage $e_2$ is developed across the circuit. In the same manner the tertiary circuit including the coil 25 has an inductance $L_3$, a capacity $C_3$, a resistance $R_3$. The mutual reactance between the primary 16 and the secondary 19 is represented by $M_1$ while the mutual reactance between the primary 16 and the tertiary winding 25 is represented by $M_2$. There is no coupling between the tertiary winding and the secondary.

We may then write the equation for the ratio of the input voltage to the output voltage as follows:

$$\frac{e_1}{e_2} = \left(Z_1 Z_2 + \omega^2 M_1^2 + \omega^2 M_2^2 \frac{Z_2}{Z_3}\right)\frac{C_2}{M_1} \quad \text{------ [1]}$$

In this equation $Z_1$ and $Z_2$ are the respective impedances of the primary and secondary circuits, and $\omega$ is equal to $2\pi$ times the frequency.

If the third circuit were to be removed, then $M_2$ would equal 0 and we have the well known equation for a double tuned coupled circuit. It is well known in the art that the breadth of the resonance curve of a double tuned coupled circuit can be changed by changing the mutual reactance of the coupling. Therefore, if $M_2$ is 0, the shape of the curve of the secondary circuit may be changed by changing $M_1$, the mutual reactance between the primary and secondary circuits.

If the impedance of the secondary and the impedance of the tertiary circuits are equal so that $$\frac{Z_2}{Z_3}=1$$

then from an inspection of Equation 1 it will be seen that by changing either $M_1$ or $M_2$ the same effect will be produced on the equation. In other words, changing either $M_1$ or $M_2$ will make the same change in the shape of the resonance curve. However, it will be seen that changes of $M_1$ and $M_2$ produce different effects on the amplitude of the output of the secondary circuit. Thus if $M_1$ is increased, the ouput voltage will not be greatly altered, but if $M_2$ is increased the output voltage will be decreased.

From a consideration of Equation 1 a rather unexpected result will be observed. If $M_2$ be overcoupled, then no matter how loose $M_1$ is made the voltage $e_2$ plotted against frequency will show the characteristic double hump of an overcoupled circuit. Under this condition, therefore, with $M_1$ loosely coupled, a double hump curve may be obtained, whereas by removing the effect of the tertiary circuit the curve instantly becomes sharp. Two extreme shapes of resonance curve may thus be obtained.

Figure 3:
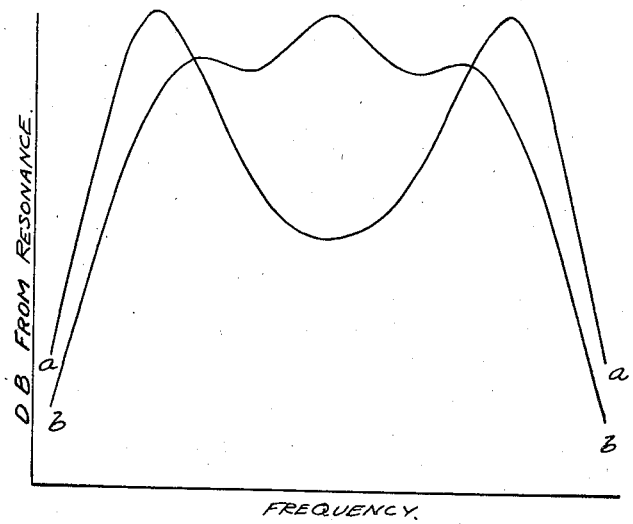
Fig. 3 shows two resonance curves of the circuit of Figs. 1 and 2 under different conditions.

If $Z_2$ and $Z_3$ are not equal to each other, then varying $M_2$ does not produce exactly the same result as varying $M_1$, in fact the curve shapes may be radically different, as shown in Fig. 3. In this figure using the circuit arrangement of Figs. 1 and 2, $M_1$ was adjusted to give so-called optimum coupling when $M_2$ was zero, and then $M_2$ was increased until the curve $a$ was obtained. This curve was made with the Q of the secondary and the Q of the tertiary circuits equal. The Q of a circuit is the relation between the inductance and the resistance and may be written as follows:

$$Q=\frac{\omega L}{R}$$

where $\omega$ equals $2\pi$ times the frequency.

Then $Q_3$ was reduced to half its original value and curve $b$ resulted. The values for $M_1$ and $M_2$ for curve $a$ are the same as their respective values for curve $b$. Making $Q_3$ different from $Q_2$ is very useful in certain cases because by this means the valley of the curve for the normal overcoupler, double-tuned circuit may be filled in, thus giving a more nearly flat top curve. As has already been mentioned, such a curve with a top approaching the flat and very steep sides is exactly what is desired in a radio receiver.

It will be noted from an inspection of Equation 1 that the thing which changes the shape of the curve is the ratio $$\frac{Z_2}{Z_3}$$

or in other words, the ratio of the impedance of the secondary circuit to the impedance of the tertiary circuit, two circuits which are not coupled together. As has already been pointed out, if this ratio is equal to 1, then the curve shape is the same as that of a conventional double tuned coupled circuit, but whenever this ratio departs from 1 there will be a change in the curve shape. Therefore, changing the impedance of either the secondary or the tertiary will change the shape of the curve, and therefore changing the Q of either of these circuits will change the shape. Changing the Q of the primary, however, will have little effect on the shape of the curve. Hence when the Q of the primary circuit is changed in the course of its normal operation, as by change of grid bias caused by signal variations, or the influence of an automatic volume control, there will be very little change in the shape of the curve of the output circuit. I may, therefore, prefer in most cases to couple the tertiary circuit to the primary circuit and to effect the curve change for the band width control by changing the Q of the tertiary circuit in a manner to be hereinafter described.

Figure 4:
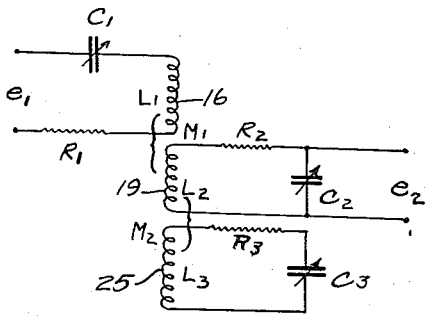
Fig. 4 is a simplified circuit diagram corresponding to Fig. 2 and showing a modification of the circuit of Fig. 2.

However, in some instances the tertiary circuit may be coupled to the secondary circuit instead of to the primary, and such an arrangement is illustrated in simplified form in Fig. 4. In this figure the primary circuit including the coil 16 has been designated the same as in Fig. 2, as is also true with the secondary circuit including the coil 19. The tertiary circuit including the coil 25, however, is now shown coupled to the secondary circuit and not to the primary circuit. With such a coupling arrangement the equation for the curve of the output circuit is as follows:

$$\frac{e_1}{e_2}=\left(Z_1Z_2+\omega^2M_1^2+\omega^2M_2^2\frac{Z_1}{Z_3}\right)\frac{C_2}{M_1}\quad[2]$$

This equation is similar to Equation 1 with the exception that instead of the ratio $$\frac{Z_2}{Z_3}$$

we have $$\frac{Z_1}{Z_3}$$

This means that alterations of the Q of the secondary circuit will now have little effect upon the shape of the curve, but alterations in either the primary circiut or the tertiary circuit will affect the shape of the curve. In some instances this circuit arrangement may not be desirable, because the Q of the primary circiut may be continually changed in the normal operation of the circuit, thus continually altering the shape of the curve, and for this reason I prefer to couple the tertiary winding to the primary instead of to the secondary.

In some instances, however, there may be an advantage in coupling to the secondary circuit, because, under certain conditions, the changing Q of the primary circuit, influenced by the automatic volume control, may be used to control the selectivity of the set.

If with the arrangement of Figs. 1 and 2, $M_1$ is undercoupled and $M_2$ coupled close enough to give a broad curve, then if the tertiary circuit is opened, it will have no effect on the other circuits and the curve will be sharp, as determined by the coupling $M_1$. But if now the tertiary circuit is closed by means of a suitable switch, it will effect the other circuits, with the result that the curve is broadened, and we then have, under control of the switch, the two extremes: a sharp and a broad curve. If the Q of the tertiary circuit, $Q_3$, is changed, intermediate curves may be obtained somewhere between the extremely sharp curve and the broad curve.

Figure 5:
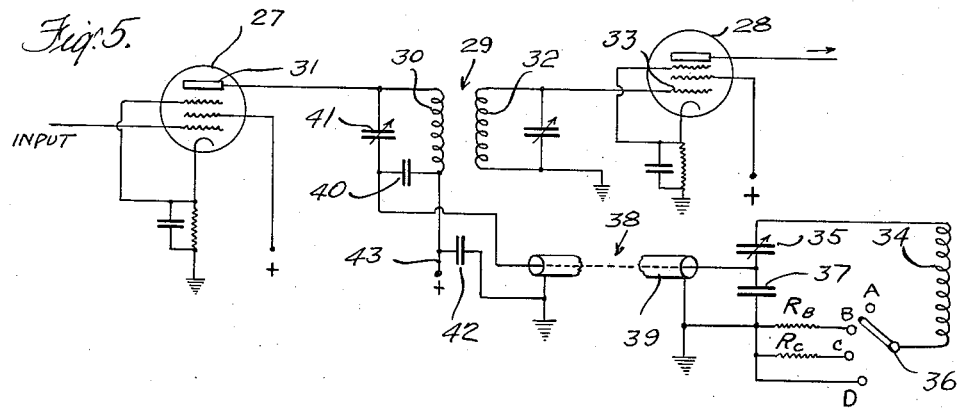
Fig. 5 is a circuit diagram illustrating one means of connecting the tertiary circuit to the coupled circuit.

One manner of changing the Q of the tertiary circuit is illustrated in Fig. 5. In this figure two amplifier stages are shown including the tubes 27 and 28 which may be coupled together by means of the transformer 29, having a primary winding 30 connected to the plate 31 of the tube 27, and a secondary winding 32 connected to the control grid 33 of the tube 28. I have found that I can couple the circuit of the tertiary winding in any one of a number of different ways to the circuit of the primary winding 30, and in Fig. 5 a convenient means of making this coupling is shown. Here the tertiary winding 34 has one end connected to the tuning condenser 35, the other end of the coil being connected to a switch arm 36 adapted to make contact with four terminals, A, B, C and D. The terminal D is connected through a coupling condenser 37 to the other side of the condenser 35 and to a coaxial cable 38, the shield 39 of which is grounded and connected to the terminal D of the switch. The other end of the coaxial cable 38 may be connected to the end of the primary coil 30 through a coupling condenser 40, a tuning condenser 41 being connected across the coil 30 and in series with the condenser 40. A by-pass condenser 42 may be connected between the shield and the source of positive potential for the coil 30, indicated at 43.

With this arrangement the tertiary circuit including coil 34 is coupled to the primary circuit including coil 30 by means of the condensers 40 and 37.

Between the contact terminal B and the grounded side of condenser 37 I provide a resistance $R_B$, while between the contact terminal C and the condenser 37 I provide a lower resistance $R_C$. When the switch 36 is on terminal A the tertiary circuit is open and it therefore has substantially no effect upon the primary circuit and therefore the output curve is sharp because of the loose coupling between the primary 30 and the secondary 32. When the switch is on the terminal D the tertiary circuit is closed and the full broadening effect thereof is produced on the output circuit. When the switch is moved to either of terminals C or B a different resistance is inserted in the tertiary circuit, thereby giving intermediate shapes of curves between the extremely sharp curve on the one hand and the broad curve on the other. By this means the output curve of the circuit may be adjusted to several different shapes, as desired.

Figure 6:
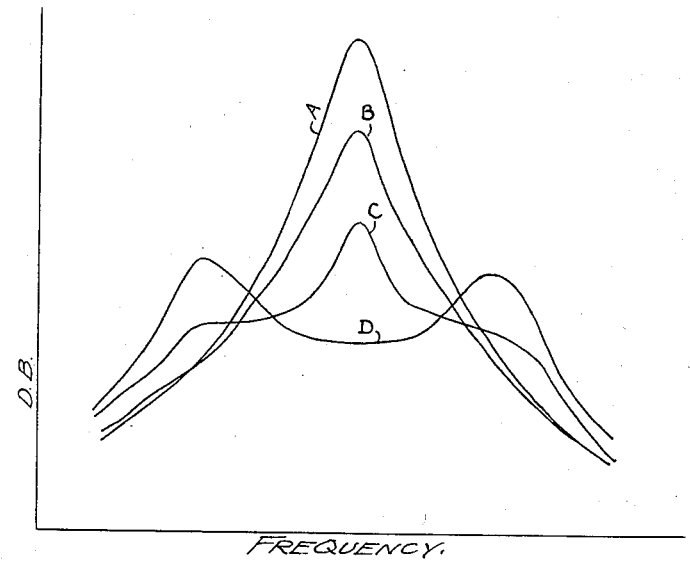
Fig. 6 shows four resonance curves of the coupled circuit of Fig. 5 illustrating the effect of the tertiary circuit for different adjustments thereof.

In Fig. 6 four curves have been shown which correspond to the switch positions shown in Fig. 5. Curve A is the sharp curve produced when the switch is on terminal A and the tertiary circuit is open. Curve B shows the change in shape when the switch is turned to terminal B and the resistance $R_B$ is thus cut into the circuit, the value of the resistance for the curve shown being approximately 500 ohms. The curve C was produced when the switch arm 36 was connected to the terminal C, and the resistance $R_C$, in this case 100 ohms, was connected in the circuit. And the curve D was produced when the switch was turned to the terminal D and the tertiary circuit was used without any dampening resistance. It will be noted from these curves that the broader the curve the more the attenuation, but this is a desirable feature, as has already been mentioned, as less sensitivity is necessary when receiving a local station with the broadest curve for the greatest amount of fidelity.

Figure 7:
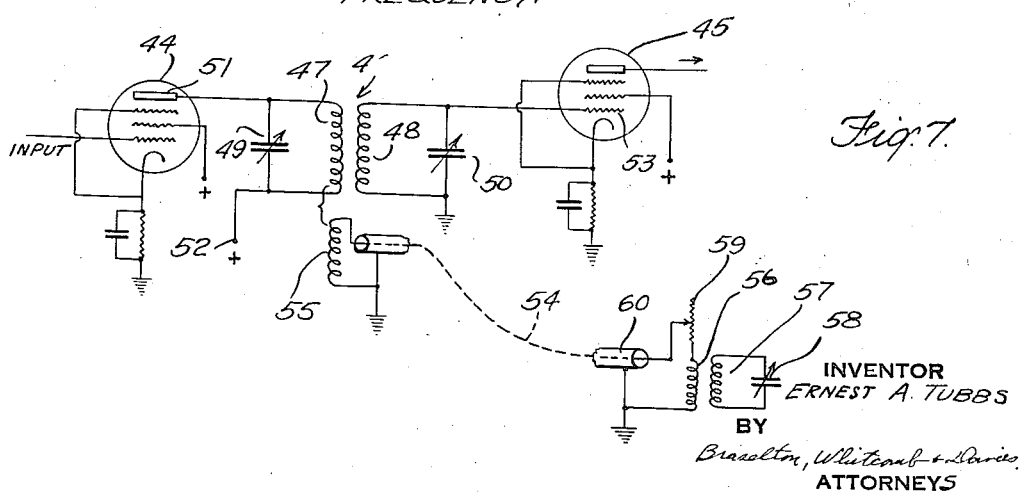
Fig. 7 is a circuit diagram illustrating another means of connecting the tertiary circuit to the coupled circuit.

In Fig. 7 I have shown another means of coupling the tertiary circuit to the primary. In this case I have used a so-called "link circuit." The amplifier circuit comprises two stages including thermionic tubes 44 and 45, coupled together by a transformer 46, having a primary 47, and a secondary 48. Both of these circuits may be tuned by means of condensers 49 and 50 respectively, and the primary may be connected to the plate 51 of the tube 44 with its other end connected to a positive source of potential, indicated at 52. The secondary 48 may have one end connected to the control grid 53 of the tube 45, while its other end may be connected to ground.

The link circuit may comprise the coaxial cable 54 having a coil 55 at one end, coupled to the primary 47, while a coil 56 at the other end may be coupled to the tertiary coil 57 which may be tuned by the condenser 58. A variable resistance 59 may be inserted in the link circuit to control the energy therein. The coaxial cable 54 forms one side of the link circuit, while the return circuit is made by means of the shield 60, which is grounded. Adjusting the variable resistance 59 has the same effect as adjusting the coupling between the coil 57 and the primary 47.

Figure 8:
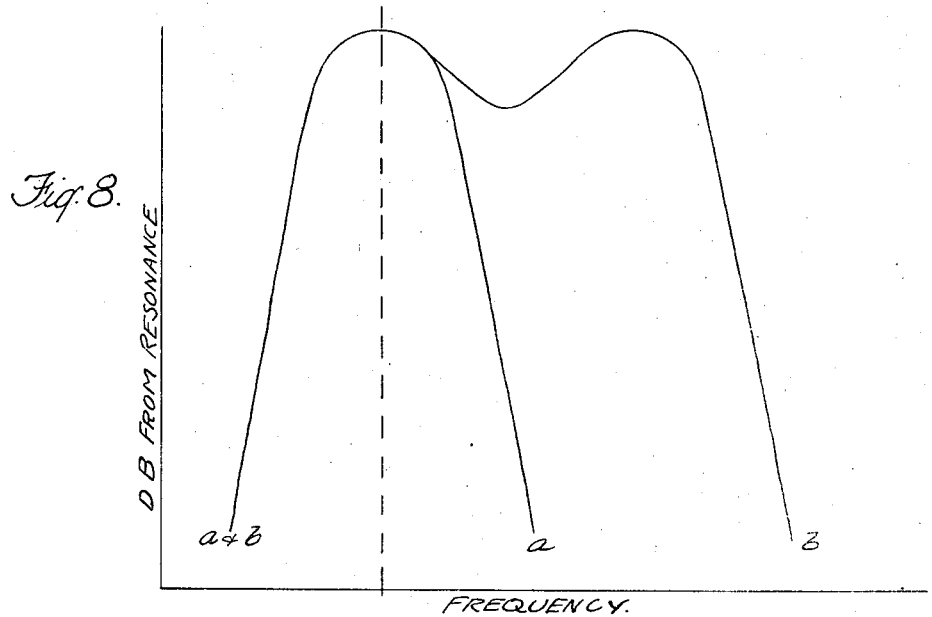
Fig. 8 shows two resonance curves for the circuit of Fig. 7 showing the effect of adjusting the tertiary circuit.

In Fig. 8 curves $a$ and $b$ illustrate the two extreme conditions of this coupling arrangement of Fig. 7. The curve $a$ is the sharp curve produced when the maximum resistance is included in the link circuit, while curve $b$ is the broadened curve produced when the resistance is cut out of the link circuit.

It will be noted in the case of this type of coupling that the curve does not expand symmetrically about the resonant frequency but that the low frequency peak stays stationary and the curve expands on the high frequency side. If, however, the link coupling be left fixed and the Q of the tertiary circuit be changed, as by inserting resistance into the circuit, explained in connection with Fig. 5, then the curve will expand symmetrically about the resonant frequency. Either arrangement may have its advantages under certain conditions.

With the arrangement shown in Fig. 5 the band width may also be controlled by changing the amount of capacity coupling instead of by changing the Q of the tertiary winding, but in this case, as in the case of the link coupling already mentioned, the curve does not expand symmetrically about the resonant frequency but expands to one side, the same as for the link coupling of Fig. 7.

Figure 9:
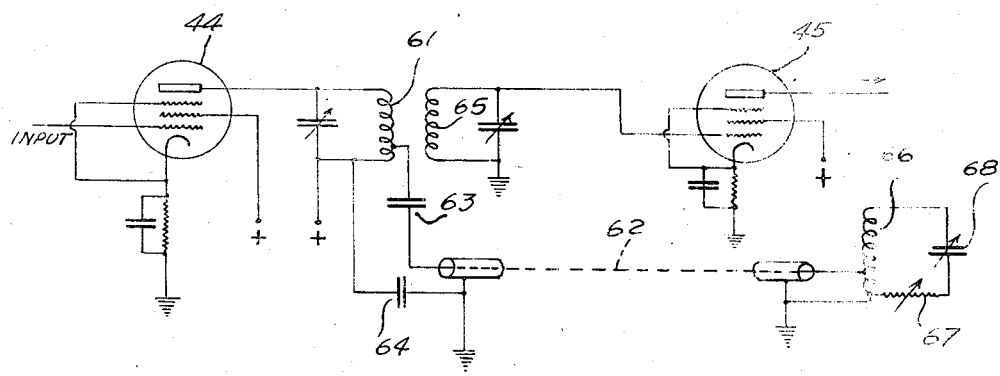
Fig. 9 is a circuit diagram illustrating still another means of connecting the tertiary circuit to the coupled circuit.
Figure 13:
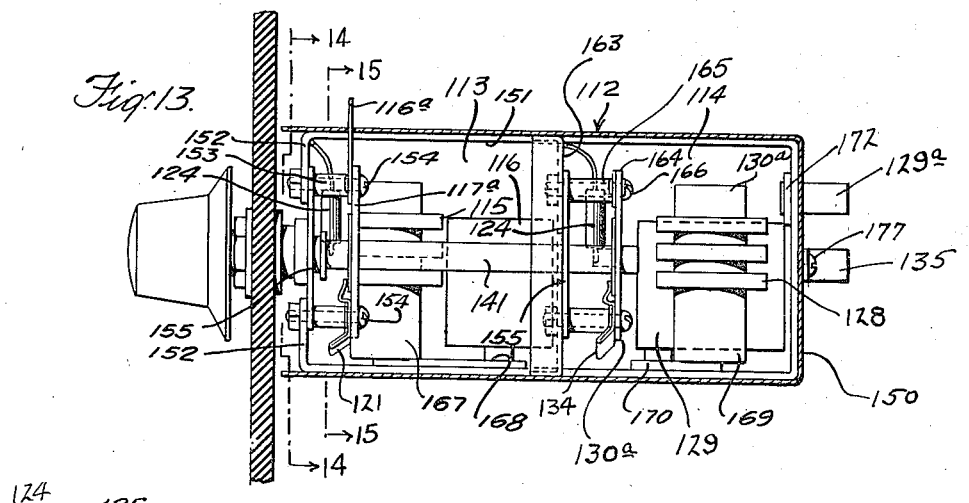
Fig. 13 is a sectional plan view of the unit of Fig. 12.
Figure 14:
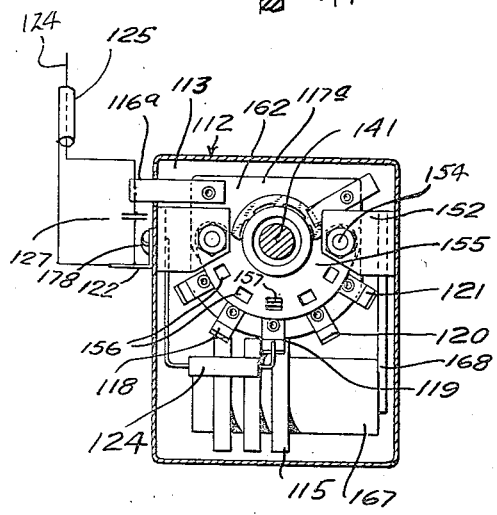
Fig. 14 is a sectional end view of the unit of Figs. 12 and 13 taken on the line 14—14 of Fig. 13.
Figure 15:
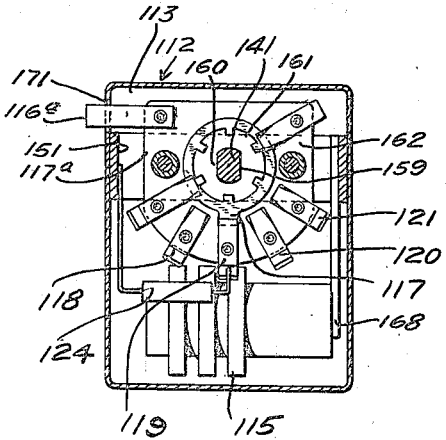
Fig. 15 is another sectional end view taken on the line 15—15 of Fig. 3.

Fig. 9 illustrates a method of coupling the tertiary winding to the primary winding of a coupled circuit, similar to that shown in Figs. 5 and 7, by direct inductive coupling, a tap being taken off each coil so that the heavy circulating currents in the tuned circuits will not flow through the coupling line. With this arrangement the primary coil 61 may have a few turns connected across the coaxial cable 62 by means of condensers 63 and 64 which prevent the short-circuiting of the direct current source. The secondary coil 65 may be exactly similar to coil 48, already described, as is also the case with the tubes 44 and 45. The other end of the coaxial cable may be connected across a few turns of the tertiary coil 66 which may be connected in series with a variable resistance 67 and the tuning condenser 68. By tapping the primary coil 61 and the tertiary coil 66 the heavy circulating currents in the tuned circuits will not flow through the coupling line. When the resistance 67 is adjusted the breadth of the curve of the output circuit is adjusted in width.

The invention may be applied to any number of amplifier stages, and in Fig. 10 I have shown it used with two stages of intermediate frequency amplification in a radio receiver of the superheterodyne type. The radio set as shown comprises a radio frequency amplifier 70 which includes the tuner and oscillator and may be connected to the antenna 71 and ground at 72. The usual mixer tube 73 may have suitable connections to the oscillator and tuner and the plate 74 of the tube may be connected to the primary coil 75 of a transformer 76. The other end of the primary may be provided with a positive potential from a source, not shown, but indicated at 77. A variable condenser 78 may be connected across the coil 75 to tune it. The transformer 76 may have a secondary coil 79, one end of which may be connected to the control grid 80 of the first intermediate frequency amplifier tube 81 while a variable condenser 82 may be connected across the coil 79 for tuning the coil to the intermediate frequency. The other end of the coil may be connected to ground through a condenser 83.

The tube 81 may have its plate 84 connected to the primary coil 85 of the transformer 86, the coil being shunted by a variable condenser 87 for tuning the coil to the intermediate frequency. The other end of the coil may be given a positive potential, illustrated at 88, from a source not shown. The transformer 86 may have a secondary 89, one end of which may be connected to the control grid 90 of the tube 91, and a variable condenser 92 may be shunted across the coil in order to tune it to the intermediate frequency. The other end of the coil may be connected to ground through a condenser 93.

The tube 91 may have its plate 94 connected to one side of a primary coil 95 of a transformer 96, while a variable condenser 97 is shunted across the coil in order to tune it to the intermediate frequency. The other end of the coil 95 may be given a positive potential, as indicated at 98, from a source, not shown.

The transformer 96 may have a secondary 99 which may have one end connected to the plate 100 of a detector tube 101, while the other end may be connected through a resistance 102 to the cathode 103 of the tube. A variable condenser 104 may be shunted across the coil 99 in order to tune it to the intermediate frequency, and a by-pass condenser 105 may be connected across the resistance 102 to by-pass high frequency currents around the resistor. A resistance 106 may also be connected to the last mentioned end of the coil 99 and the other end of this resistance may be connected to an audio-frequency amplifier 107 to the output of which may be connected the usual loud speaker 108 or any other desired translating device.

Automatic volume control in the circuit may be obtained by connecting the outer end of the resistance 106 through a resistance 109 to the grid circuits of the tubes 81 and 91, the former being through a resistance 110 and the latter being through a resistance 111. The bias of the tubes 81 and 91 is therefore changed, in a well known manner, with changes of input signal strength, so that the circuit tends to maintain a substantially constant volume output.

In order to apply the invention to the circuit, as shown, I preferably provide a separate shielded container 112 having two compartments 113 and 114, which container may be mounted at any convenient place on or near the chassis and may be grounded thereto. I place separate tertiary circuits in these compartments and connect them to the coupled circuits by means of coaxial cables.

In the compartment 113 I have shown a tertiary coil 115 connected at one end to a variable condenser 116, the other end of which may be connected to the terminal 116a. The other end of the coil may be connected to the arm 117 of a switch 117a. The switch arm 117 is adapted to sweep across a plurality of contacts 118, 119, 120 and 121. The contact 121 may be connected directly to the terminal 122 for the other side of the circuit and the contact 118 may be left open, corresponding to the switch 36 of Fig. 5.

In varying the Q of the tertiary circuit it is to be understood that the amount of variation will depend on the shape of the curve desired as well as the constants of the circuits involved. The values of resistances to be inserted in the circuit for making the change in the shape of the curve may be determined either mathematically or experimentally by a cut-and-try process. Where two tertiary circuits are used to control the curves of two separate coupled circuits, it may be desirable to change them both in gradual steps, or, the desired result may be obtained by varying them at different rates. In one particular instance where the circuit of Fig. 10 was used, I obtained good results by using one intermediate value for the Q of the first tertiary coil introduced into the circuit at the second position of the switch and one intermediate value for the Q of the second tertiary circuit maintained in the circuit for both the second and third positions of the second switch.

In Fig. 10 therefore I have illustrated the arrangement just described. A resistance 123 is shown connected between the contact 119 and the terminal 122, while the contact 120 is shown connected directly to the terminal 122.

In order to connect the first tertiary circuit to the transformer 76 I preferably use a coaxial cable 124 provided with a shield 125 which may be grounded. One end of the cable may be connected to the terminal 116a, while the shield may be connected to the terminal 122 and to ground. The other end of the cable may be connected to the circuit including the coil 75 and condenser 78. I prefer to use two coupling condensers 126 and 127 across the terminals of the coaxial cable, the first at the end adjacent the primary 75, shown connected between the end of the coil 75 and the condenser 78, with the cable connected at the juncture of the two condensers, a by-pass condenser 77a being connected between the end of the coil 75 and ground. The second condenser 127 may be connected directly between the terminals 116a and 122.

By the use of the two coupling condensers large oscillating currents are eliminated from the coaxial cable and isolated in the shielded containers. The condenser 127 is shown diagrammatically within the compartment 113, but actually it may be placed outside the container at the end of the coaxial cable.

The second tertiary winding 128 in the compartment 114 may have one end connected to the variable condenser 129, the other end of which may be connected to the terminal 129a. The other end of the winding may be connected to the arm 130 of a switch 130a. The arm 130 may be arranged to sweep across the contacts 131, 132, 133 and 134. For the reasons already explained I have shown the contact 131 not connected to anything, while the contact 134 is connected directly to the terminal 135. The contacts 132 and 133 may be connected together and through a resistance 136 to the terminal 135.

This second tertiary circuit may be connected to the primary of the transformer 86 in a similar manner as just described for the other circuit. The coaxial cable 137, provided with a grounded shield 138, may have one end connected to the terminal 129a and the other end connected to the lower end of the primary 85. Coupling condensers 139, adjacent the tertiary circuit, and 140, adjacent the primary coil 85, may be connected across the coaxial cable, as shown.

I prefer to mechanically connect the switch arms 117 and 130 of the two tertiary circuits on a common shaft, as indicated by the dot and dash line 41, so that these switches may be simultaneously operated by a single knob.

It will be noted in the particular connections of the tertiary circuits of Fig. 10, that although the switches are arranged to be simultaneously operated, the two circuits are not altered proportionally as the switches are changed. In the uppermost position of the switches with the switch arms connected to the contacts 118 and 131, both tertiary circuits are completely isolated so that they have substantially no effect, and the curves of the transformers 76, 86 and 96 are the sharpest, resulting in the output curve indicated at 142 in Fig. 11. When the switches are moved counterclockwise, to the contacts 119 and 132, a resistance is connected in each tertiary circuit and the output curves of the transformers 76 and 86 are both slightly broadened and produce for the entire circuit the curve 143, illustrated in Fig. 11. When the switches are moved still farther counterclockwise, to the terminals 120 and 133, the first tertiary circuit including the coil 115 produces its maximum effect on the transformer 76, while the second tertiary circuit, including the coil 128, still has the resistance 136 in its circuit. The output curve of the transformer 76 is therefore further broadened, while the output curve of the transformer 86 is not changed, and the resultant curve of the three transformers is represented by the curve 144 in Fig. 11. Then, if the switches are turned to their lowermost position on the contacts 121 and 134, both tertiary circuits have their maximum effect on the transformers 76 and 86 and together produce a double-hump curve, the valley of which is filled in by the sharp unaltered transformer 96, and the combined curve 145 of Fig. 11 is the result.

It will be understood that the curves in Fig. 11 were made by plotting the change in DB (decibels) from the resonance value against frequency, in order to compare the shapes of the curves, but that the output voltage amplitude will be different for each curve, such value decreasing as the curve is broadened. This has the advantageous effect, as has already been pointed out, of reducing the signal for a local station for which the broadest possible curve is used.

A feature of the invention is the provision of a container which houses the two tertiary coils and which forms a single unit to be attached somewhere adjacent the radio set and connected to it by the two coaxial cables. Such a control unit, which has been found to give good results, is illustrated in Figs. 12 to 15 inclusive. The container may comprise a metal can 112, rectangular in cross-section and somewhat longer than it is wide, closed at one end by the integral wall 150 and open at the other end.

All of the electrical elements of the two tertiary circuits shown may be mounted upon a U-shaped bracket 151 which is adapted to fit tightly into the can 112. The U-shaped member 151 may have inwardly extending fingers 152 at the open end of the U, upon which the switch 117a may be mounted and also upon which the shaft 141 for operating the switch may be rotatably mounted. The switch may be spaced from the fingers 152 by suitable spacers 153, secured by bolts 154.

The fingers 152 may also support a switch controlling member 155 which may be held in place by the spacers 153 and which may have a plurality of holes 156, each corresponding to one of the contacts of the switch and adapted to engage a spring member 157 attached to the shaft 141 to releasably hold the switch arm against each of the switch contacts. The shaft 141 may be rotatably mounted in a sleeve 158 which may be secured to the switch control member 155. Mounting the switch control member 155 on the ends of the bracket 151, therefore, centers the shaft 141 in the bracket.

The shaft 141 may be provided with flat sides 159 to engage a flat sided hole 160 (see Fig. 15) in a circular insulating member 161, which may carry the switch arm 117. This member 161 may be rotatably mounted in a plate 162 of insulating material, forming the main support for the switch, and which may be attached to the bracket by means of the spacers 153 and bolts 154, already mentioned. The contacts 118, 119, 120 and 121 may be mounted on this plate 162 and the terminals thereof may protrude radially from the lower edge of the plate as indicated.

A little more than midway towards the opposite end of the bracket 151 I may provide a metal shield 163, (Figs. 12 and 13) which may be rigidly attached to the bracket and which may conform closely to the interior of the container 112, so that it makes a partition, dividing the container into the compartments 113 and 114. Upon this shield 163 I may mount the second switch 130a, which may be exactly similar to the one already described, comprising a main insulating plate 164 which may be supported from the shield 163 within the compartment 114 by means of spacers 165 and bolts 166. This plate 164 may support the contacts 131, 132, 133 and 134, and also a rotatable insulating member for carrying the switch arm 130, which member may be provided with a flat sided hole to receive the end of the shaft 141 so that it may be rotated by the shaft. Thus constructed the two switches 117a and 130a are operated simultaneously by the shaft 141, and the spacing of the contacts and the switch arms on the two switches is such that corresponding contacts are engaged simultaneously by the switch arms.

The tertiary winding 115 may be wound upon a cylinder 167, which may be mounted within the compartment 113, by means of a bracket 168, (Figs. 13, 14 and 15) secured to one side of the bracket 151. Also the variable condenser 116 may be similarly mounted within the compartment 113 upon the same bracket 168.

In like manner the tertiary winding 128, which may be wound upon a form 169 may be supported on a bracket 170 which may be secured to the bracket 151 and which may also support the variable condenser 129 for the second tertiary circuit.

The resistor 124 for the first tertiary circuit may be connected between the contact 119 and ground on the bracket 151. The resistance 136 for the second tertiary circuit may be connected between the contacts 132 and 133, which are connected together, and ground on the bracket 151.

I preferably position the terminal 116a for connecting the coaxial cable to the first tertiary circuit on the plate 162 of the switch 117a, and extend this terminal outwardly to protrude through a slot 171 formed in the container 112 adjacent the open end thereof. Also I may prefer to position the terminal 129a for connecting the coaxial cable to the second tertiary circuit upon an insulating plate 172 secured to the inner end of the bracket 151 and bent in such a manner that it protrudes through a hole 173 in the end wall of the container.

A lug 135 may be secured by the screw 177 to form a ground connection for the coaxial cable connected to the second tertiary coil, and a lug 122 may be secured against the container at the forward end by a screw 178 for connecting the first coaxial cable.

The sleeve 158 supporting the shaft 141 may have a threaded end portion 174 which may be inserted through a suitable hole in a panel 175, and a nut 176 screwed on to the extended portion thereof to secure the sleeve in rigid position upon the panel. This supports the bracket 151 and, of course the shaft 141 in position on the panel, and the container may then be slipped over the bracket until its open end comes almost in contact with the panel. Then the container 117 may be secured in position on the bracket by means of a screw 177 inserted through a suitable hole in the end wall of the container and screwed into a tapped hole in the end of the bracket. Also a screw 178 may be used to secure the open end of the container to the bracket. The connections, for the coaxial cable for the first tertiary circuit may be made by connecting the center of the cable to the lug 116a and the shield to the lug 122, the condenser 127 being also connected if desired on the outside of the container across these two terminals. In like manner the coaxial cable for the second tertiary circuit may have its central wire connected to the lug 129a and its shield connected to the lug 135, and the condenser 139 may be connected between these two terminals on the outside of the container.

A suitable knob 181 may be attached to the outer end of the shaft 141 in any desired manner, as indicated, for rotating the shaft.

The container assembly may be mounted anywhere in the vicinity of the radio set, the length of the coaxial cables 125 and 138 being unimportant. The arrangement is therefore flexible in that the container may be mounted upon the chassis proper, or, if not convenient to mount it on the chassis, it may be mounted anywhere in the cabinet containing the radio set, or even used as an auxiliary attachment which may be placed outside of the cabinet. Holes may preferably be provided in the wall of the container in alignment with the adjusting screws 116b and 129b for the condensers 116 and 129 so that the condensers may be adjusted from the outside.

As shown in the drawings, the shield plate 163 is used to separate the two compartments 113 and 114. I wish to emphasize the fact that the shielding between these two tertiary circuits is very important, inasmuch as the first circuit is associated with the grid of the amplifier tube 81 and the second is associated with the plate of that tube. If one of these circuits, therefore, is permitted to influence the other, detrimental oscillations may be set up in the circuit. This may be avoided by care in the shielding. For this reason, under certain conditions, I may prefer to use a double wall in place of the single shield 163, or even provide two separate containers, one for the compartment 113 and one for the compartment 114.

In the construction of Fig. 10 the controlling unit is shown applied to the intermediate circuits of a superheterodyne in which two intermediate amplifying tubes are shown, and hence there are three coupled circuits including the transformers 76, 86 and 96. Many superheterodyne sets are constructed with a single intermediate frequency amplifying tube, and the invention has been found particularly effective with such circuits.

In general it has been found impossible to expand the band width of both coils of a single stage intermediate frequency amplifier, such as shown in Fig. 16, because when both coils are expanded by the method of the prior art, a curve corresponding to the curve $a$ of Fig. 3 and having two similar peaks, twice the height of the peaks shown in that curve will result. Obviously such a curve with the resulting deep valley is far from what is desired in a radio receiver. I have found that by properly proportioning the Q's of the tertiary circuit and the circuit to which it is not coupled, as previously explained in connection with Figs. 2, 3 and 4, this valley may be filled in, giving substantially the desired flat top to the curve.

In Fig. 16 I have shown a diagram of such a receiving set. The parts of this set are much the same as the parts of the circuit of Fig. 10 and need not be described in detail. The tuner 182, mixer tube 183, intermediate amplifying tube 184, detector tube 185, and audio amplifier 186 correspond to the tuner 70, mixer 73, amplifying tube 81, detector tube 101 and audio amplifier 107 of Fig. 10, the second intermediate amplifier 91 of that figure being omitted in Fig. 16. The transformers 187 and 188, therefore, correspond to the transformers 76 and 86 of Fig. 10, and are connected in exactly the same manner by coaxial cables 189 and 190 to the two tertiary circuits 191 and 192, which correspond to the circuits 115 and 128 of Fig. 10. These circuits may be exactly the same as those shown in Fig. 10, except that I preferably arrange that the Q's of the tertiary circuits be different from the Q's of the secondary circuits of the transformers 187 and 188. In order to indicate that these Q's are different, I have shown resistors 193 and 194 in series, respectively, with the coils 191 and 192. This difference of Q's is important where the single amplifying stage is used, because if the Q's of the tertiary circuits are the same as those of the secondary circuits, the desired result will not be obtained.

Where the three coupled circuits are used with the two amplifying tubes, as shown in Fig. 10, and the first two circuits are influenced by the tertiary circuits, the curves of Fig. 11 are obtained when the Q's of the tertiary and secondary circuits are substantially the same and when the tertiary circuits are connected for their maximum effect. This makes a saddle-top curve of the combined first two coupled circuits and the valley of this curve is filled in with the unaltered sharp circuit.

Where two coupled circuits only are used, as in the circuit of Fig. 16, and both are expanded, there is no sharp circuit to fill in the valley of the curve, and hence the principles discussed in connection with the curves of Fig. 3 are employed. The Q's of the tertiary circuits are made quite different from the Q's of the secondary circuits, and the result is that when the Q's of the tertiary circuits are then increased by decreasing the resistances of the circuits, controlled by the switches, to their minimum value, the curve broadens symmetrically, producing the curve 195, shown in Fig. 17.

In one instance employing the circuit of Fig. 16, small universal aircore coils of the same size were used, so that without the resistances 193 and 194 the Q's of the tertiary and secondary circuit were substantially equal. It was then found that, in order to produce the curve 195, the value of the resistances 193 and 194 was preferably fixed at approximately 25 ohms each. It will be understood, however, that this value is subject to considerable variation depending on the other constants of the circuits.

In the circuits of Figs. 10 and 16 the tertiary circuits are shown coupled to the primary circuits, and in Fig. 10 the Q's of the secondary circuits were made substantially equal to the Q's of the tertiary circuits, while in Fig. 16 the Q's of the secondary and tertiary circuits were made distinctly unequal. It should be noted that if the tertiary circuits are coupled to the secondary circuits, following the principles illustrated in Fig. 4, then the Q's of the tertiary circuits in Fig. 10 should be substantially equal to the Q's of the primary circuits, and the Q's of the tertiary circuits of Fig. 16 should be unequal to the Q's of the primary circuits.

From the above description it will be evident that I have provided a method of controlling the band width of a coupled circuit or a plurality of coupled circuits arranged in cascade, and that this control is extremely flexible and free of mechanical connections to the coupled circuits, and may be remotely connected to the circuits. The arrangement is extremely simple, easy to manufacture and to adjust, and eliminate moving parts other than a simple switch or rheostat which need be constructed without exceptional accuracy. The separate controlling unit may be applied to existing radio sets with improvement in the quality of reception and without appreciably changing the circuit of the set, and the invention generally contributes to the quality of reception, the ease of control, and the elimination of interference.

In the various figures where an adjustment of the Q of the tertiary circuit is made to effect the control I have shown switches by means of which resistances are inserted in the circuit. This forms a simple and inexpensive method of changing the band width of the set in a series of steps, but I wish it to be clearly understood that the curve may be gradually and continually broadened if desired by using rheostats in place of the switch and resistors. Movement of the rheostat arm will gradually introduce the resistance into the circuit so as to obtain the gradual narrowing of the curve or gradually cut the resistance out of the circuit for broadening the curve.

Also, in the various circuits I have shown the coupled circuits as comprising transformers with inductive coupling. I do not wish to limit my invention to inductive coupling, as I have found that any type of coupling may be used with the invention with equally good results.

While I have shown and described coupled circuits comprising a driving circuit and a driven circuit, the invention is also applicable to three or more circuits coupled together in a chain or cascade arrangement, as shown in Fig. 18, where the tuned primary circuit 196 is coupled to the tuned circuit 197, which is in turn coupled to the tuned circuit 198. The tuned circuit 199 corresponds to the tertiary circuits of the other figures and is shown coupled to the primary 196, although it might be coupled to the circuit 198, in accordance with the principles already referred to.

In the application of the invention the resonance curve of the circuit is really broadened by the addition of another degree of freedom to the circuit. Thus, if a loosely coupled circuit has a single resonant point, coupling a tertiary circuit, tuned at the resonant frequency, to it will produce a saddle-top curve with two resonant points. The addition of the second resonant point gives another period to the circuit and hence another degree of freedom and broadens the band width thereof. A discussion of degrees of freedom in electrical circuits may be found in chapter XIII of "High Frequency Alternating Currents," by McIlwain and Brainerd.

While I may prefer to change the Q of the tertiary circuits by the introduction of resistances 193 and 194, into them, as shown in Fig. 16, any other method of changing the Q's may be used. Thus the placing of a piece of metal into the proximity of the tertiary coil will change the Q of the circuit and comes within the spirit of this invention.

The invention has been described in connection with a sound receiver, but it may be used for the reception of any kind of intelligence, as for instance, a television receiver, and the band width may therefore be much wider than the 10 k. c. referred to.

The band width controlling unit illustrated in Figs. 12 to 15 inclusive may incorporate any arrangement for either controlling the Q of the auxiliary circuit, or the coupling between that circuit and the network which is to be controlled, such as the arrangements shown in Figs. 5, 7 and 9.

In Fig. 10 I have shown three coupling networks, two of which I broaden, producing a combined saddle-top resonance curve and filling in the valley of this curve with the sharp curve of the unaltered circuit. It is within the spirit of the invention, however, to broaden each of the networks by using the principles outlined in connection with Figs. 2, 3 and 4, by making the Q's of the auxiliary circuits distinctly different from the Q's of the circuits to which they are not coupled. This will give a substantially flat-top resonance curve for each network, and any number of networks may be thus controlled.

Many modifications of the invention may be made without departing from the spirit thereof, and I do not wish to limit myself except by the limitations included in the appended claims.

What I claim is:

1. The method of controlling the band width of a coupled circuit system having three coupled tuned circuits, one of which is remotely located with respect to the other two, which comprises controlling the Q of the tuned circuit remotely located.

2. The method of controlling the band width of a coupled circuit having a primary and a secondary which comprises coupling a tertiary circuit to said primary circuit while maintaining zero coupling between said tertiary circuit and said secondary circuit, and adjusting the constants of said tertiary circuit in a predetermined manner.

3. In a device of the class described a driving circuit, a driven circuit coupled to said driving circuit, a tertiary circuit coupled to said driving circuit and having substantially zero coupling to said driven circuit, and means to vary the Q of said tertiary circuit in a predetermined manner.

4. A device of the class described comprising a tuned driving circuit, a tuned driven circuit, a tertiary circuit coupled to said driving circuit and having zero coupling to said driven circuit, and means to vary the Q of said tertiary circuit in a predetermined manner.

5. A device of the class described comprising a driving circuit, a driven circuit coupled to said driving circuit, a tertiary circuit coupled to said driving circuit, and having zero coupling to said driven circuit, and means to add resistance in a predetermined manner to said tertiary circuit.

6. A device of the class described comprising a tuned driving circuit, a tuned driven circuit coupled to said driving circuit, a tertiary circuit capacitively coupled to one of said circuits, and means to alter the Q of said tertiary circuit in a predetermined manner.

7. A device of the class described comprising a driving circuit, a driven circuit coupled to said driving circuit, a second driving circuit, a second driven circuit coupled to said second driving circuit, amplifying means connected between said first driven circuit and said second driving circuit, an auxiliary circuit coupled to said first driving circuit and having zero coupling to said first driven circuit, a second auxiliary circuit coupled to said second driving circuit and having zero coupling to said second driven circuit, means to alter the Q of said first auxiliary circuit in a predetermined manner, and means to alter the Q of said second auxiliary circuit in a predetermined manner.

8. A device of the class described comprising a driving circuit, a driven circuit coupled to said driving circuit, an auxiliary circuit coupled to said driving circuit but not to said driven circuit, the Q of said auxiliary circuit being different from the Q of said driven circuit, a second driving circuit, a second driven circuit coupled to said second driving circuit, amplifying means connected between said first driven circuit and said second driving circuit, a second auxiliary circuit coupled to said second driving circuit, the Q of said second auxiliary circuit being different from the Q of said second driven circuit, the Q's of said circuits having such values that a broad substantially flat-top resonance curve may be produced, means to alter in a predetermined manner the Q of said first auxiliary circuit, and means to alter in a predetermined manner the Q of said second auxiliary circuit, such alteration being for the purpose of changing the width of said resonance curve.

9. In a superheterodyne receiver having one stage of intermediate frequency amplification consisting of two coupled circuits connected by an amplifying device, each of said coupled circuits comprising a driving circuit and a driven circuit, an auxiliary circuit coupled to said first driving circuit only, the Q of said auxiliary circuit being different from the Q of the circuit to which it is not coupled, a second auxiliary circuit coupled to said second driving circuit only, the Q of said second auxiliary circuit being different from the Q of the circuit to which it is not coupled, the Q values of said circuits being such that a broad, substantially flat-top resonance curve may be produced, means to vary the Q of said first auxiliary circuit, and means to vary the Q of said second auxiliary circuit, such variation being for the purpose of changing the width of said resonance curve.

10. In a superheterodyne receiver having one stage of intermediate frequency amplification consisting of two coupled circuits connected by an amplifying device, each of said coupled circuits comprising a driving circuit and a driven circuit, an auxiliary circuit coupled to the first driving circuit but not to the first driven circuit, the Q of said auxiliary circuit being different from the Q of the first driven circuit, a second auxiliary circuit coupled to the second driving circuit but not to the second driven circuit, the Q of said second auxiliary circuit being different from the Q of the second driven circuit, the Q values of said circuits being such that a broad substantially flat-top resonance curve may be produced, means to vary the Q of said first auxiliary circuit, and means to vary the Q of the second auxiliary circuit, such variation being for the purpose of changing the width of said resonance curve.

11. In a superheterodyne receiver having two stages of intermediate frequency amplification consisting of three selective coupling networks connected by amplifying devices, each of said networks comprising a plurality of tuned circuits, an auxiliary circuit coupled to one only of the tuned circuits of one of said networks, the Q of said auxiliary circuit at one value thereof being substantially the same as the Q of another tuned circuit of the same network to which it is not coupled, a second auxiliary circuit coupled to one only of the tuned circuits of another of said networks, the Q of said second auxiliary circuit at one value thereof being substantially the same as the Q of another tuned circuit of said other network to which it is not coupled, means to vary the Q of said first auxiliary circuit, and means to vary the Q of said second auxiliary circuit.

12. In a superheterodyne receiver having two stages of intermediate frequency amplification consisting of three coupled circuits connected by amplifying devices, each of said coupled circuits comprising a driving circuit and a driven circuit, an auxiliary circuit coupled to one driving circuit but not to its driven circuit, the Q of said auxiliary circuit at one value thereof being substantially the same as the Q of the driven circuit which is coupled to said driving circuit, a second auxiliary circuit coupled to another driving circuit but not to its driven circuit, the Q of said second auxiliary circuit at one value thereof being substantially the same as the Q of the driven circuit which is coupled to said other driving circuit, means to vary the Q of said first auxiliary circuit, and means to vary the Q of said second auxiliary circuit.

13. In a superheterodyne receiver having two stages of intermediate frequency amplification consisting of three selective coupling networks connected by amplifying devices, each of said networks comprising a driving circuit and a driven circuit, an auxiliary circuit coupled to one of said driving circuits but not to a driven circuit, the Q of said auxiliary circuit being substantially the same as the Q of the driven circuit in the same network, a second auxiliary circuit coupled to another driving circuit but not to a driven circuit, the Q of said second auxiliary circuit being substantially the same as the Q of the driven circuit in the same network, means to vary the Q of said first auxiliary circuit, means to vary the Q of said second auxiliary circuit, and means to simultaneously operate said two last mentioned means.

14. A device of the class described comprising a primary circuit, a secondary circuit coupled thereto, and a tertiary circuit coupled to said primary circuit but not to the secondary circuit, the Q of said tertiary circuit at one value thereof being substantially the same as the Q of said secondary circuit.

15. A device of the class described comprising a primary circuit, a secondary circuit coupled thereto, a tertiary circuit coupled to said primary circuit but not to the secondary circuit, the Q of said tertiary circuit being different from the Q of said secondary circuit.

16. In a device of the class described, a selective network comprising a primary circuit and a secondary circuit coupled thereto, and means to broaden the resonance curve of said network, said means comprising an auxiliary circuit coupled to said primary circuit but not to said secondary circuit.

17. The combination with electrical resonance apparatus having a pair of tuned circuits coupled together, of means for varying the band width of said coupled circuits, said means comprising a third tuned circuit located at a point remote from said coupled circuits, means for varying the Q of said third circuit, electrical means for coupling said third circuit to one of said coupled circuits, and a shielding container enclosing only said third tuned circuit and said means for varying the Q thereof.

18. The combination with electrical resonance apparatus having a first pair of tuned circuits coupled together, a second pair of tuned circuits coupled together, and a relay interposed between said pairs of tuned circuits; of means for varying the band width of said pairs of coupled circuits, said means comprising a third pair of tuned circuits located at a point remote from said first and second coupled circuits, means for varying the Q of each of said third circuits, electrical means for coupling each of said third circuits to one of said first and second coupled circuits respectively, and a shielding container for enclosing said third circuit only and the means for varying the Q thereof, said container having a partition serving to shield said last mentioned circuits from each other.

ERNEST A. TUBBS.